US012571878B2

(12) United States Patent
Kim

(10) Patent No.: US 12,571,878 B2
(45) Date of Patent: Mar. 10, 2026

(54) RADAR COUPLER AND METHOD FOR ASSEMBLING THE SAME

(71) Applicant: HL KLEMOVE CORP., Incheon (KR)

(72) Inventor: Sang-Min Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 690 days.

(21) Appl. No.: 17/689,439

(22) Filed: Mar. 8, 2022

(65) Prior Publication Data

US 2022/0291332 A1 Sep. 15, 2022

(30) Foreign Application Priority Data

Mar. 12, 2021 (KR) ........................ 10-2021-0032712

(51) Int. Cl.
| | |
|---|---|
| *G01S 7/02* | (2006.01) |
| *G01S 13/931* | (2020.01) |
| *B60R 11/00* | (2006.01) |
| *B60R 19/02* | (2006.01) |
| *B60R 21/0134* | (2006.01) |
| *H04N 23/51* | (2023.01) |

(52) U.S. Cl.
CPC .............. *G01S 7/028* (2021.05); *G01S 7/027* (2021.05); *G01S 13/931* (2013.01); *G01S 2013/93271* (2020.01)

(58) Field of Classification Search
CPC .................. G01S 7/028; G01S 13/931; G01S 2013/93271; G01S 7/027; G01S 7/02; G01S 7/032; G01S 2013/9327; G01S 13/93; B60R 19/483; B60R 21/0134; B60R 11/00; B60R 19/48; B60R 2011/004; B60R 2011/0052; F16B 2/22; B60W 2420/408; B60W 40/02; B60W 2420/506; B60Y 2304/07
USPC ........................................................... 342/70
See application file for complete search history.

(56) References Cited

U.S. PATENT DOCUMENTS 9,914,419 B2 * 3/2018 Fath ...................... H01Q 1/3233
10,953,815 B2 * 3/2021 Edgarian ................ H04N 23/51
(Continued)

FOREIGN PATENT DOCUMENTS

| CN | 206470396 U | | 9/2019 |
|---|---|---|---|
| CN | 210047409 U | * | 2/2020 |

(Continued)

OTHER PUBLICATIONS

Office Action dated May 22, 2024 for corresponding Chinese Patent Application No. 202210235197.1, along with an English machine translation (14 pages).
(Continued)

*Primary Examiner* — Vladimir Magloire
*Assistant Examiner* — Remash R Guyah
(74) *Attorney, Agent, or Firm* — Hauptman Ham, LLP

(57) ABSTRACT

The present embodiments relate to a radar coupler and a method for assembling the same. More specifically, there may be provided a radar coupler and a method for assembling the same, which may prevent a radar housing from escaping off a bracket when the bracket and the radar housing are simultaneously fastened together through a coupling part provided in the radar housing without using a socket, thereby preventing quality degradation that would arise if a socket is used and saving manufacturing costs.

11 Claims, 12 Drawing Sheets

(56) References Cited

U.S. PATENT DOCUMENTS

| | | | | |
|---|---|---|---|---|
| 2017/0023674 A1* | 1/2017 | Aleem | .................. | G01S 13/931 |
| 2020/0033440 A1* | 1/2020 | Park | ........................ | G01S 7/032 |
| 2021/0162932 A1* | 6/2021 | Edgarian | ................ | H04N 23/51 |

FOREIGN PATENT DOCUMENTS

| | | | | | |
|---|---|---|---|---|---|
| CN | 211918607 U | | 11/2020 | | |
| KR | 20120025896 A | * | 3/2012 | ............. | B60R 19/02 |
| KR | 20140109716 A | * | 9/2014 | ........... | G01S 13/931 |
| KR | 10-2015-0017214 A | | 2/2015 | | |
| KR | 10-2016-0043298 A | | 4/2016 | | |
| KR | 20170112762 A | * | 10/2017 | ........... | G01S 7/4026 |
| KR | 10-2020-0077260 A | | 6/2020 | | |
| KR | 20220076905 A | * | 12/2020 | ............... | G01S 7/03 |

OTHER PUBLICATIONS

Office Action issued on Jan. 13, 2026, for corresponding Korean Patent Application No. 10-2021-0032712, along with an English machine translation (12 pages).

* cited by examiner

RADAR COUPLER AND METHOD FOR ASSEMBLING THE SAME

CROSS-REFERENCE TO RELATED APPLICATION

This application claims priority from Korean Patent Application No. 10-2021-0032712, filed on Mar. 12, 2021, which is hereby incorporated by reference for all purposes as if fully set forth herein.

BACKGROUND

Field

The present embodiments relate to a radar coupler and a method for assembling the same and, more specifically, to a radar coupler, that may couple a bracket with a radar housing without using a socket, and a method for assembling the same.

Description of Related Art

Currently, vehicle radar is used as an effective accident prevention system used to prevent vehicle accidents.

Vehicle radars recognize vehicles on the road and gather the distances between the host vehicle and other vehicles, relative speeds, directions, or other information. An electronic control unit 123 and controllers in the vehicle radars control cruising and inter-vehicle distancing using the gathered data. Such a vehicle radar is equipped in a rear space inside the front bumper of the vehicle and gathers information data necessary for the host vehicle. The vehicle radar is built in the radar housing, fastened to a bracket, and mounted forward of the vehicle. Typically, a socket component is used for smoothing and maintaining fastening between the radar housing and the bracket.

However, a structure for fastening between the radar housing and the bracket using a socket requires a piece of automatic equipment for managing the fastening force and multiple sockets, causing an increase in manufacturing costs. Further, when the radar housing and the bracket are fastened, the socket may be damaged. In particular, if the socket is broken after fastening, the radar housing may escape off the bracket.

BRIEF SUMMARY

According to the present embodiments, there may be provided a radar coupler and a method for assembling the same, which may prevent a radar housing from escaping off a bracket when the bracket and the radar housing are simultaneously fastened together through a coupling part provided in the radar housing without using a socket.

According to an embodiment, there may be provided a radar coupler including a bracket having a protrusion projecting forward and mounted to a vehicle and a radar housing including a box-shape body in which a radar is built and a coupling part provided on an outer edge of the body. The coupling part includes a coupling hole into which the protrusion of the bracket is fitted.

According to an embodiment, there may be provided a method for assembling a radar coupler, comprising a first axis coupling step of sliding and fitting a first opening provided in a radar housing over a first protrusion provided in a bracket, a second axis coupling step of sliding and fitting a second opening provided in the radar housing over a second protrusion provided in the bracket by rotating the radar housing in a tilted state of the radar housing, and a third axis coupling step of horizontally placing the radar housing on the bracket and press-fitting a third protrusion provided in the bracket into a through hole.

According to the present embodiments, there may be provided a radar coupler and a method for assembling the same, which may prevent a radar housing from escaping off a bracket when the bracket and the radar housing are simultaneously fastened together through a coupling part provided in the radar housing without using a socket, thereby preventing quality degradation that would arise if a socket is used and saving manufacturing costs.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
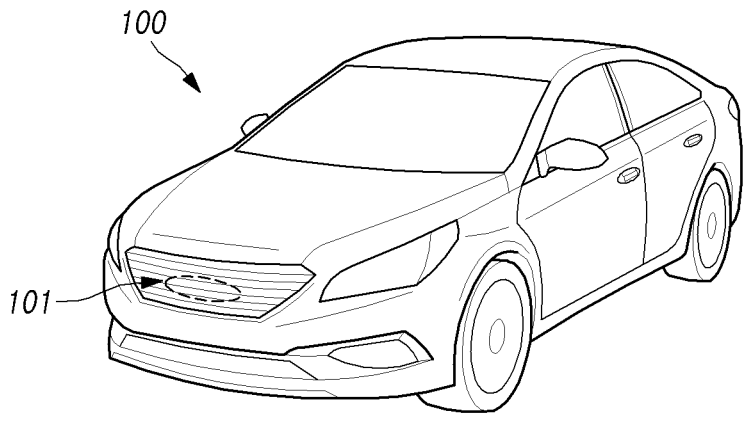
FIG. 1 is a perspective view illustrating a radar coupler installed at a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
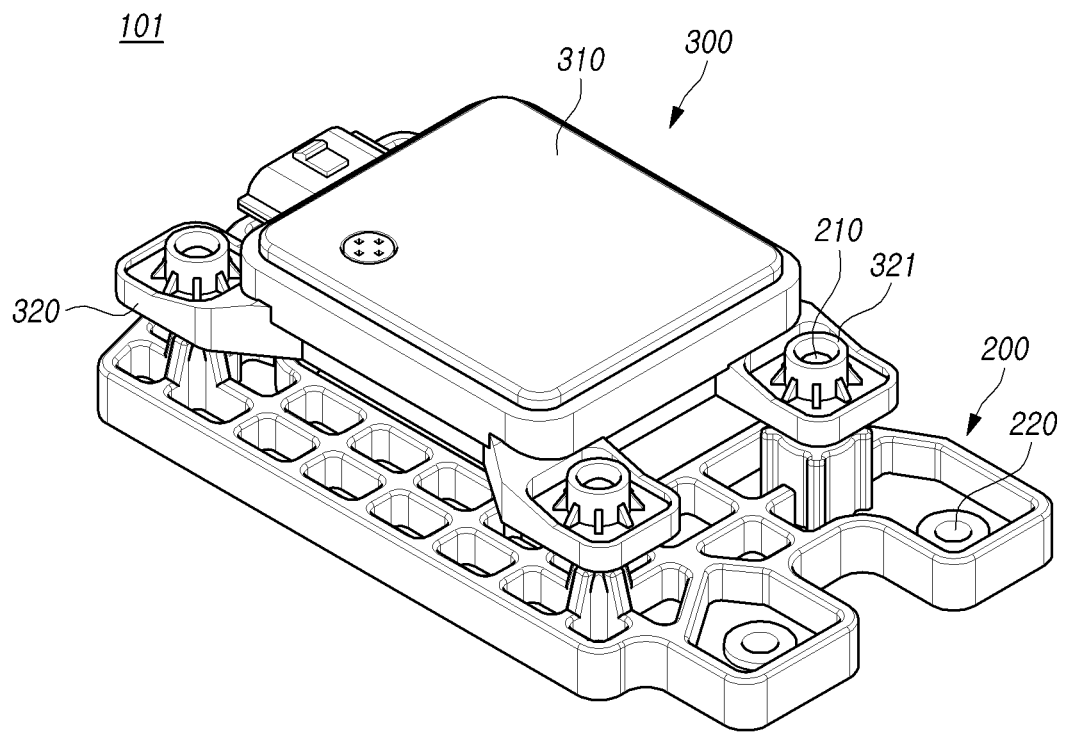
FIG. 2 is a perspective view illustrating a radar coupler according to the present embodiments.
Figure 3:
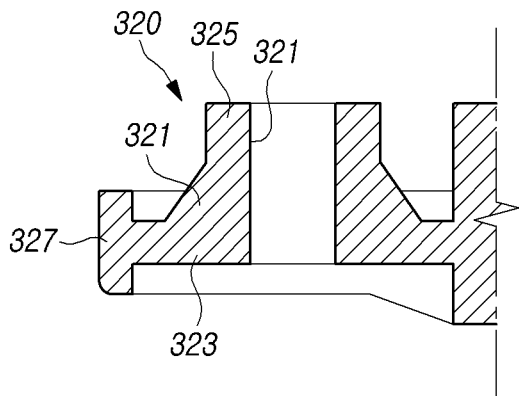
FIG. 3 is a cross-sectional view illustrating a radar housing included in a radar coupler according to the present embodiments.
Figure 4:
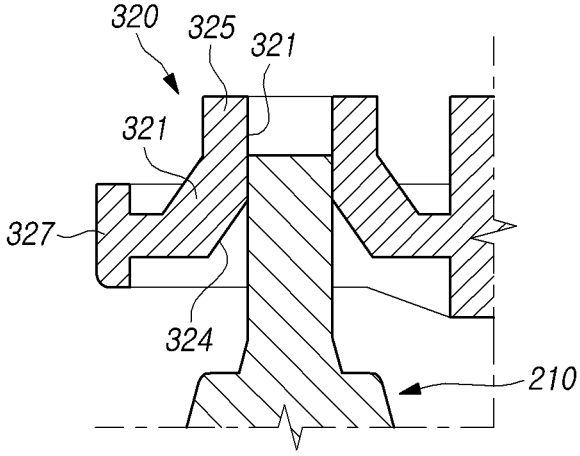
FIGS. 4 and 5 are cross-sectional views illustrating a coupling between a coupling part of a radar housing and a protrusion of a bracket according to the present embodiments.
Figure 5:
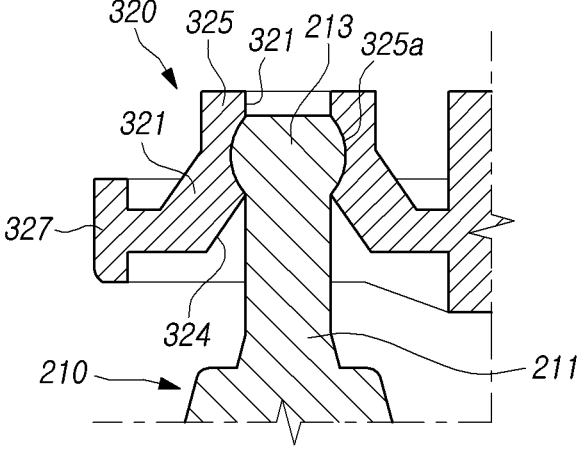
Figure 6:
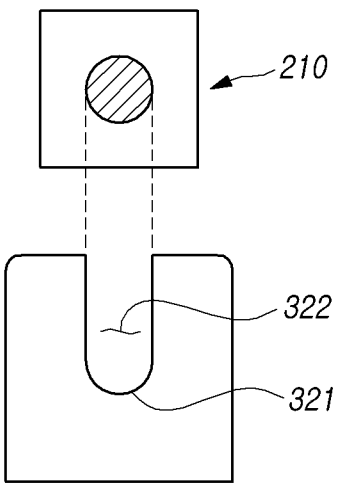
FIGS. 6 and 7 are plan views illustrating a coupling between a coupling part of a radar housing and a protrusion of a bracket according to the present embodiments.
Figure 7:
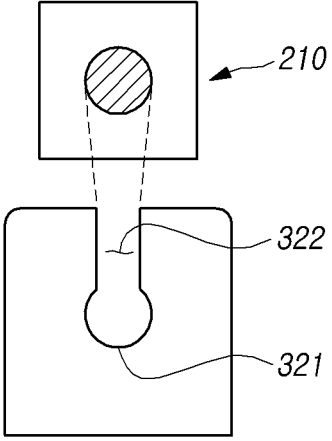
Figure 8:
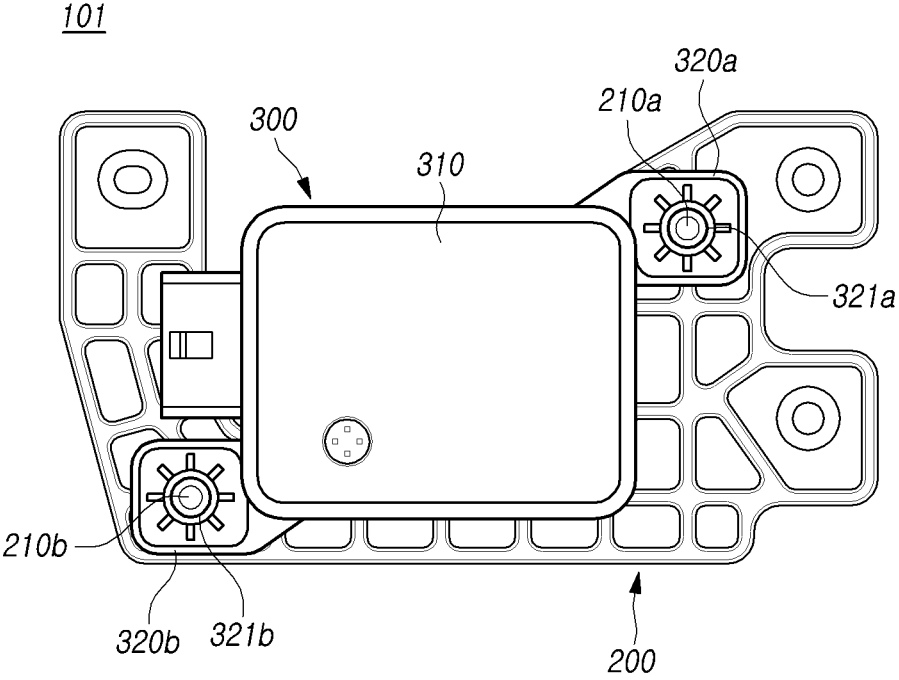
FIGS. 8 and 9 are plan views illustrating a state in which a coupling part of a radar housing and a protrusion of a bracket are arranged according to the present embodiments.
Figure 9:
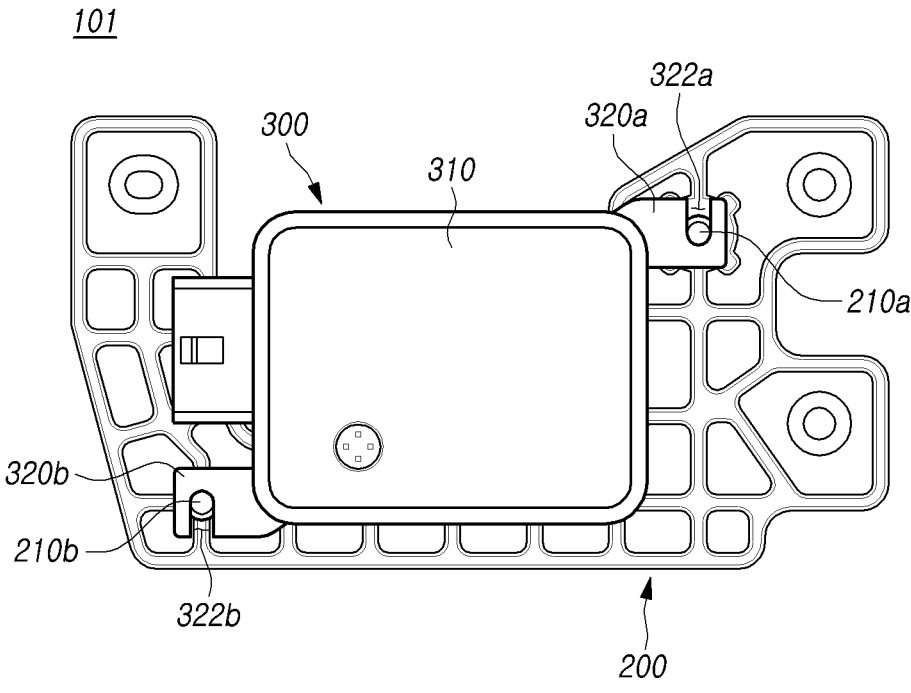
Figure 10:
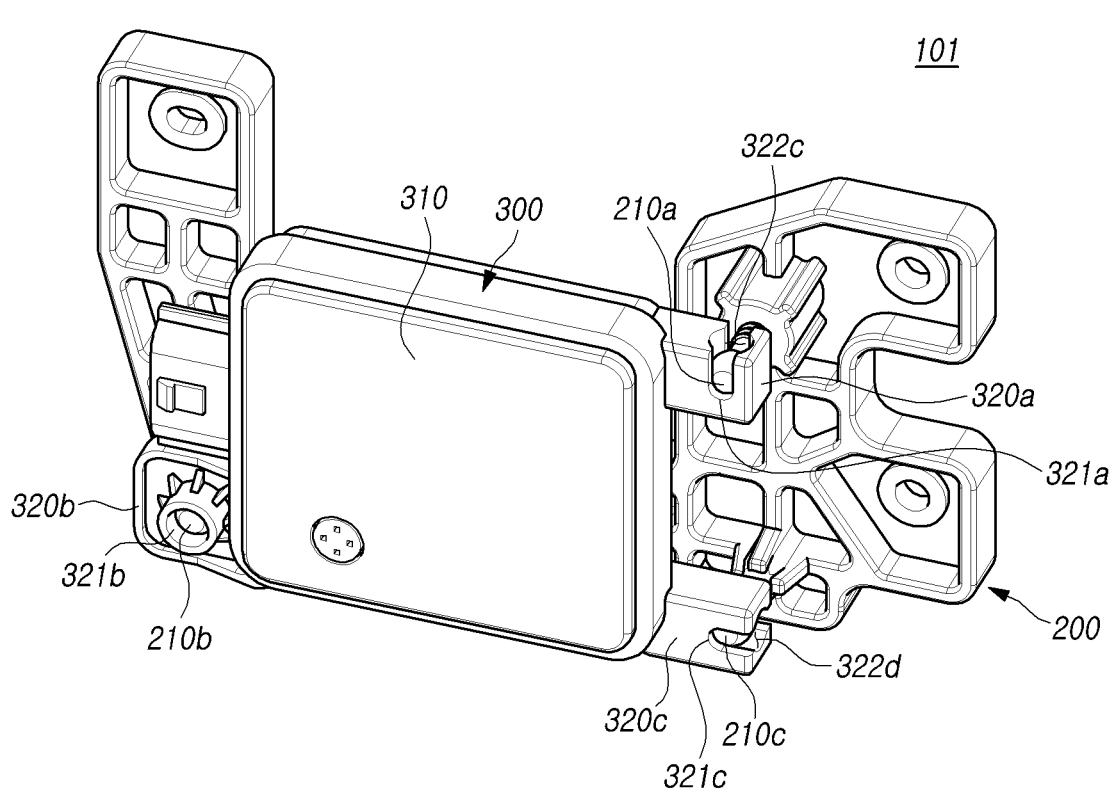
FIG. 10 is a perspective view illustrating a state in which a coupling part of a radar housing and a protrusion of a bracket are arranged according to the present embodiments.
Figure 11:
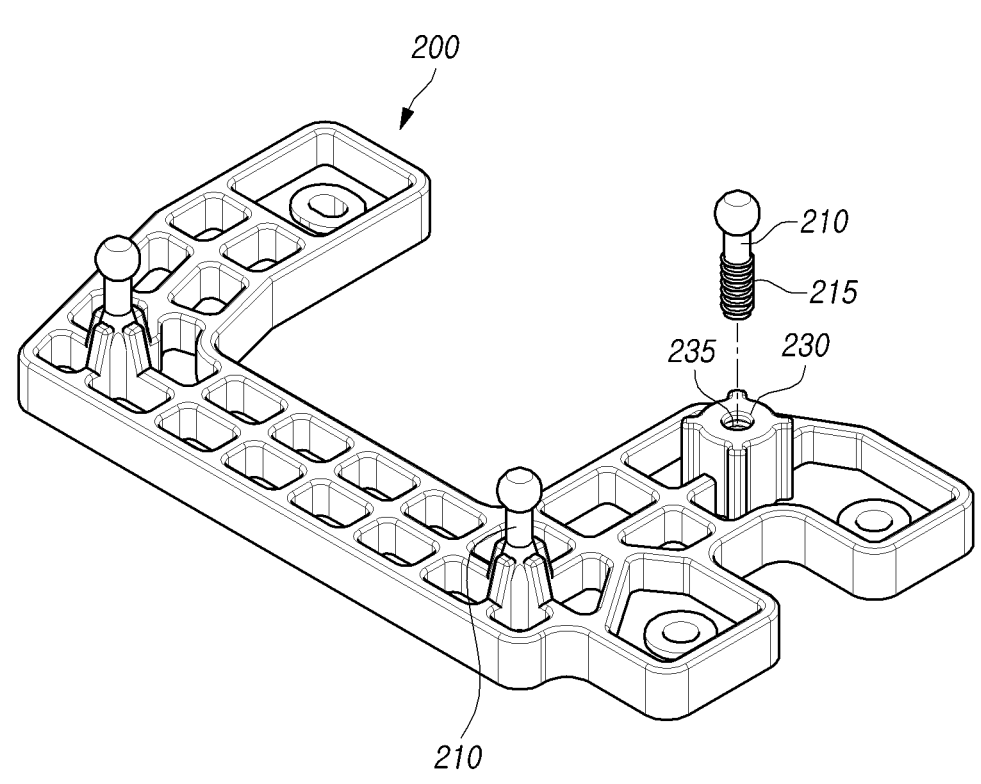
FIG. 11 is a perspective view illustrating a bracket included in a radar coupler according to the present embodiments.

FIG. 1 is a perspective view illustrating a radar coupler installed at a vehicle according to the present embodiments. FIG. 2 is a perspective view illustrating a radar coupler according to the present embodiments. FIG. 3 is a cross-sectional view illustrating a radar housing included in a radar coupler according to the present embodiments. FIGS. 4 and 5 are cross-sectional views illustrating a coupling between a coupling part of a radar housing and a protrusion of a bracket according to the present embodiments. FIGS. 6 and 7 are plan views illustrating a coupling between a coupling part of a radar housing and a protrusion of a bracket according to the present embodiments. FIGS. 8 and 9 are plan views illustrating a state in which a coupling part of a radar housing and a protrusion of a bracket are arranged according to the present embodiments. FIG. 10 is a perspective view illustrating a state in which a coupling part of a radar housing and a protrusion of a bracket are arranged according to the present embodiments. FIG. 11 is a perspective view illustrating a bracket included in a radar coupler according to the present embodiments.

As shown in the drawings, according to the present embodiments, a radar coupler includes a bracket having a protrusion projecting forward and mounted to a vehicle and a radar housing including a box-shape body in which a radar is built and a coupling part provided on an outer edge of the body. The coupling part includes a coupling hole into which the protrusion of the bracket is fitted.

A vehicle sensing system, a driver sensing system, an object detection system, or an alert system senses and gathers data from the outside of the vehicle through sensors provided in the vehicle and detects objects around the vehicle, thereby assisting the vehicle's driving when the driver or the vehicle's automated driving system drives the vehicle forward or backward. Such a system includes a processor or a controller that receives data sensed and gathered by one or more sensors, processes the received data, and generates vehicle alert signals, steering signals, or control signals.

Referring to FIG. 1, according to the present embodiments, a radar coupler 101 includes at least one radar 103. For example, the radar coupler 101 may include one or more of a forward detection radar mounted on the front of the vehicle 100, a rearward detection radar mounted on the rear of the vehicle 100, and a side detection radars mounted on each side of the vehicle 100.

According to the present embodiments, the radar coupler 101 may be disposed inside the vehicle grill, bumper, or body. However, without limited thereto, the radar coupler 101 may be provided as a part of a component constituting the exterior of the vehicle, such as the vehicle grill, bumper, or body. If the radar coupler 101 is disposed inside the vehicle, the vehicle may be allowed a better aesthetic appearance and convenience of mounting the radar coupler 101.

Referring to FIG. 2, according to the present embodiments, a radar coupler 101 includes a bracket 200 having a protrusion 210 projecting forward and mounted to the vehicle 100 and a radar housing 300 including a box-shape body 310 in which a radar is built and a coupling part 320 provided on an outer edge of the body 310. The coupling part 320 includes a coupling hole 321 into which the protrusion 210 of the bracket 200 is fitted.

The bracket 200 may be provided with mounting holes 220 for fixing to the vehicle 100. The bracket 200 may be fixed to the vehicle by fastening members (not shown) fitted into the mounting holes 220, so that the radar coupler 101 may be mounted to the vehicle 100.

The protrusion 210 of the bracket 200 is provided to protrude forward. "Forward" may mean an outward direction perpendicular to a plane where the radar coupler 101 is mounted to the vehicle 100 and in which the body 310 faces outward of the vehicle.

Three protrusions 210 may be provided as shown in FIG. 2, however, the number of the protrusions 210 is not limited thereto. For example, two protrusions 210 may be provided, or four or more protrusions 210 may be provided.

A radar may be placed inside the box-shaped body 310 of the radar housing 300. The radar placed in the body 310 may analyze transmission signals and reception signals, process data, and accordingly detect information about an object. To that end, the radar may include an electronic control unit (ECU) or a processor. However, the present embodiments are not limited thereto. If no electronic control unit (ECU) or protrusion is provided in the radar itself, the radar may gather information about the object and transmit a signal to the separately provided electronic control unit (ECU) or processor, and the electronic control unit (ECU) or processor may analyze the received signal and process data and detect object information.

Data transmission or signal communication from the radar to the electronic control unit (ECU) or processor may use known techniques, e.g., a communication link, such as an appropriate vehicle network bus.

The coupling part 320 may be provided at an outer edge of the body 310. For example, the coupling part 320 may be disposed at a corner of the outer edge of the body 310. The coupling part 320 may be disposed in a center of the outer edge of the body 310. Coupling parts 320 may be disposed at a corner and center of the outer edge of the body 310. However, the coupling part 320 needs to be disposed in a position corresponding to the protrusion 210 of the bracket 200. Accordingly, the position of the edge of the body 310, where the coupling part 320 is disposed may be varied depending on the position of the protrusion 210 of the bracket 200.

The coupling hole 321 is provided to pass through the coupling part 320. The coupling part 210 of the bracket 200 is press-fitted into the coupling hole 321 so that the radar housing 300 and the bracket 200 may be coupled together. For example, the radar housing 300 and the bracket 200 may be coupled to each other by placing the radar housing 300 in front of the bracket 200 and press-fitting the protrusion 210 of the bracket 200 into the coupling hole 321 of the coupling part 320. Thus, as the protrusion 210 is fitted into the coupling hole 321, the radar housing 300 and the bracket 200 may be fastened together.

As described above, according to the present embodiments, it is possible to couple and fasten the bracket 200 and the radar housing 300 together through the coupling part 320 of the radar housing 300 without using a socket, thus preventing quality degradation which would occur if a socket is used and saving manufacturing costs.

Referring to FIGS. 2 and 3, the coupling part 320 may include a first support 323 having the coupling hole 321 and a second support 325. The first support 323 may extend outward from the coupling hole 321, and one outer side thereof is connected to the body 310. The second support 325 may extend forward along the coupling hole. The inner circumferential surface of the first support 323, in which the coupling hole is provided, may be elastically deformed. Accordingly, as the first support 323 is elastically deformed, the protrusion 210 may be inserted into the coupling hole 321.

The first support 323 may extend outward from the coupling hole 321, and one outer side thereof may be connected to the body 310. The extending first support 323 may distribute the insertion force of the protrusion 210 when the inner circumferential surface is elastically deformed, preventing damage to the coupling part 320.

The outer circumferential surface of the first support 323 may be provided in a rectangular shape, but is not limited thereto. For example, the outer circumferential surface of the first support 323 may be provided in other shapes, e.g., a circle or a hexagon.

The second support 325 may be integrally formed with the first support 323. In other words, the second support 325 may extend forward from the first support 323.

The coupling hole 321 may be provided on the inner circumferential surface of the second support 325. The second support 325 may press and support the outer circumferential surface of the protrusion 210 inserted into the coupling hole 321, allowing the protrusion 210 to be fixed in a specific position of the inner circumferential surface of the second support 325.

The outer circumferential surface of the second support 325 may be provided in a cylindrical shape, but is not limited thereto. For example, the outer circumferential surface of the second support 325 may be provided in other shapes, e.g., a hexahedral shape or a hemispherical shape.

The coupling part 320 may further include a third support 327 that extends forward and rearward from the other end of the first support 323. For example, the third support 327 may extend in the forward direction, which is the same direction as the direction in which the second support 325 extends, and in the rearward direction, which is opposite to the direction in which the second support 325 extends.

The inner circumferential surface of the third support 327 may be provided in a shape connected along the outer circumferential surface of the first support 323. Accordingly, the inner circumferential surface of the third support 327 may be provided in the same shape as the outer circumferential surface of the first support 323.

The third support may further distribute the insertion force of the protrusion 210 applied to the first support 323 when the protrusion 210 is inserted into the coupling hole 321, preventing damage to the first support 323.

The coupling part 320 may further include a fourth support 329 connecting the forward surface of the first support 323 with the outer circumferential surface of the second support 325. In this case, a plurality of fourth supports 329 may be provided to be spaced apart from each other.

The fourth support 329 may reinforce rigidity of the first support 323 and the second support 325. For example, the fourth support 329 may prevent damage to the first support 323 when the protrusion 210 is inserted into the coupling hole 321 and prevent damage to the second support 325 with the protrusion 210 fitting in the coupling hole 321.

The first support 323 to the fourth support 329 may be formed of an elastic material. For example, the first support 323 to the fourth support 329 may be formed of plastic, but without limited there to, they may be formed of a known elastic material.

Referring to FIG. 4, the protrusion 210 may be provided in a pillar shape. For example, the protrusion 210 may have a pillar shape projecting forward, but is not limited thereto. For example, the protrusion 210 may be provided in an inclined pillar shape whose diameter reduces forward and, in this case, the protrusion 210 may easily be press-fitted into the coupling hole 321.

The pillar-shaped protrusion 210 may have a cylindrical shape, but without limited thereto, it may also have a rectangular pillar shape. In other words, the pillar-shaped protrusion 210 may be provided in a any shape that is fitted and fixed in the coupling hole.

If the protrusion 210 is provided in a pillar shape, a portion where the first support 323 and the second support 325 are connected to each other may have an inclined portion 324 in which the diameter of the coupling hole increases rearward. In this case, when the protrusion 210 is inserted into the coupling hole 321, the front end of the inclined portion 324 may be elastically deformed.

The inclined portion 324 allows the protrusion 210 to move along the inclined portion 324 and fit into the coupling hole 321 even when the coupling hole 321 provided on the inner circumferential surface of the first support 323 and the second support 325 is not correctly positioned on the upper portion of the protrusion 210 when the radar housing 300 and the bracket 200 are coupled together. In other words, the inclined portion 324 may serve to guide the protrusion 210 to the coupling hole 321.

Referring to FIG. 5, an end of the protrusion 210 may have a protruding end 213 that radially projects from the body 211. The protruding end 213 may be shaped as a truncated sphere, but is not limited thereto. For example, the protruding end 213 may be shaped as a complete sphere, a hexahedral, or a truncated cone.

In this case, a seating groove 325a with the same curvature as the protruding end 213 may be formed in the inner circumferential surface of the second support 325 to rest the protruding end 213 in a specific position of the coupling hole 321. Accordingly, the seating groove 325a may prevent the protruding end 213 from escaping off the inner circumferential surface of the second support 325.

The seating groove 325a may be provided in a position connected to the front end of the inclined portion 324 of the second support 325. However, without limited thereto, the seating groove 325*a* may be provided between the front end of the inclined portion 324 and the front end of the second support 325.

Accordingly, the protrusion 210 may be guided to the coupling hole 321 by the inclined portion 324, and the protrusion 210 may be prevented from escaping off the coupling hole 321 by the seating groove 325*a* where the projecting end 213 of the protrusion 210 rests.

Referring to FIG. 6, the coupling hole 321 may be provided with an opening 322 through which a second side of the coupling part 320 is open.

The second side may mean a side surface in any one direction of the rest of the outer circumferential surface except for the side connected to the body 310. The second side should also be interpreted in the same manner below.

The protrusion 210 may slide and fit into the coupling hole 321 with the opening 322. For example, the protrusion 210 may be inserted through a first side of the coupling part 320 with the opening 322 and slide along the opening 322, and reach the coupling hole 321 and coupled while being supported by the inner circumferential surface of the second support 325.

In this case, the width of the opening 322 and the diameter of the coupling hole 321 are formed to be smaller than the diameter of the protrusion 210. The protrusion 210 may be inserted into the opening 322 which is elastically deformed by press-fitting and be slid along the opening 322 and, if reaching the coupling hole 321, it may be fixed and coupled in a specific position by the inner circumferential surface of the second support 325.

Referring to FIG. 7, the width of the opening 322 may be provided to be smaller than the diameter of the coupling hole 321. In this case, the protrusion 210 may be slid while elastically deforming the inner circumferential surface of the opening 322, reach the coupling hole 321, and coupled while being supported by the inner circumferential surface of the second support 325. Since the diameter of the coupling hole 321 is smaller than the width of the opening 322, the protrusion 210 may be prevented from escaping off through the opening 322, i.e., escaping from the coupling part 320.

Although FIGS. 6 and 7 illustrate that the pillar-shape protrusion 210 is fitted into the coupling hole 321 with the opening 322, the present embodiments may also be applied even where an end of the protrusion 210 is provided with a projecting end (not shown). In this case, a seating groove (not shown) may be provided which is continuous to the inner circumferential surface of the opening 322 and the inner circumferential surface of the coupling hole 321, and the protrusion 210 may be inserted and slid along the seating groove (not shown) to be fitted into the coupling hole 321.

Referring to FIG. 8, among a plurality of coupling parts 320, a first coupling part 320*a* may be disposed at one of the four corners of the body 310, and a second coupling part 320*b* may be disposed at another corner positioned diagonally from the first coupling part 320*a*.

For example, as shown in FIG. 8, the first coupling part 320*a* may be disposed at the upper right corner of the body 310, and the second coupling part 320*b* may be disposed at the lower left corner of the body 310. However, the present embodiments are not limited thereto. The first coupling part 320*a* may be disposed at the upper left corner of the body 310, and the second coupling part 320*b* may be disposed at the lower right corner of the body 310.

A first protrusion 210*a* and a second protrusion 210*b* may be disposed in positions corresponding to the first coupling part 320*a* and the second coupling part 320*b*, respectively, and fitted into a first coupling hole 321*a* and a second coupling hole 321*b*, respectively. Accordingly, the bracket 200 may be coupled to the radar housing 300 and the coupling may be stably supported by couplings between the protrusions 210*a* and 210*b* and the coupling holes 321*a* and 321*b* of the coupling parts 320*a* and 320*b*.

Referring to FIG. 9, the first coupling part 320*a* may have a first opening 322*a* whose second side is open from the coupling hole in a first direction, and the second coupling part 320*b* may have a second opening 322*b* whose second side is open from the coupling hole in a second direction.

As illustrated in FIG. 9, the first direction in which the first opening 322*a* is open from the coupling hole may be a right direction of the first coupling part 320*a*, and the second direction in which the second opening 322*b* is open from the coupling hole may be a lower direction of the second coupling part 320*b*, but are not limited thereto. As an example, the first direction may be an upper direction of the first coupling part 320*a*, and the second direction may be a lower direction of the second coupling part 320*b*. In other words, the first direction and the second direction in which they are open from the coupling holes should be interpreted as different directions in which one of the first opening 322*a* and the second opening 322*b* may be coupled with one of the first protrusion 210*a* and the second protrusion 210*b* by rotating the radar housing 300, with the other of the first opening 322*a* and the second opening 322*b* coupled with the other of the first protrusion 210*a* and the second protrusion 210*b*.

The first protrusion 210*a* may be slid through the first opening 322*a* of the first coupling part 320*a* and fitted into the first coupling hole 321*a*, and the second protrusion 210*b* may be slid through the second opening 322*b* of the second coupling part 320*b* and fitted into the second coupling hole 321*b*. The first opening 322*a* and the second opening 322*b* are open in different directions, i.e., the first and second directions, to complement anti-escape of the protrusions 210*a* and 210*b* from the coupling holes 321*a* and 321*b*, with the protrusions 210*a* and 210*b* fitted in the coupling holes 321*a* and 321*b*, thereby preventing the radar housing 300 from escaping off the bracket 200.

Referring to FIG. 10, among the plurality of coupling parts 320, a third coupling part 320*c* may be provided at a corner between the first coupling part 320*a* and the second coupling part 320*b*. For example, the third coupling part 320*c* may be disposed at a lower right corner of the body 310 between the first coupling part 320*a* disposed at the upper right corner of the body 310 and the second coupling part 320*b* disposed at the lower left corner of the body 310. However, without limited thereto, the third coupling part 320*c* may be disposed at an upper left corner of the body 310 between the first coupling part 320*a* disposed at the upper right corner of the body 310 and the second coupling part 320*b* disposed at the lower left corner of the body 310.

The first coupling hole 321*a* of the first coupling part 320*a* may have a third opening 322*c* whose second side is open from the coupling hole in a third direction, and the third coupling part 320*c* may have a fourth opening 322*d* whose second side is open from the coupling hole in a fourth direction perpendicular to the third direction. The second coupling part 320*b* may have the unopened second coupling hole 321*b*.

The fourth direction in which the third coupling hole 321*c* is open may be perpendicular to the third direction in which the first coupling hole 321*a* is open. As illustrated in FIG. 10, the third direction in which the first coupling hole 321*a* is open may be an upper direction of the first coupling part 320*a*, and the fourth direction in which the third coupling hole 321*c* is open may be a right direction of the third coupling part 320*c*, which is perpendicular to the third direction. However, this is merely an example, and the present embodiments may also be applied to other combinations in which the third direction and the fourth direction in which they are open from the coupling holes are directions perpendicular to each other, in which one of the third opening 322*c* and the fourth opening 322*d* may be coupled with one of the first protrusion 210*a* and the third protrusion 210*c* by rotating the radar housing 300, with the other of the third opening 322*c* and the fourth opening 322*d* coupled with the other of the first protrusion 210*a* and the third protrusion 210*c*.

The first protrusion 210*a* may be fitted into the first coupling hole 321*a* through the third opening 322*c*, preventing the protrusions 210*a*, 210*b*, and 210*c* from radial, vertical escape-off. The second protrusion 210*a* may be fitted into the unopened second coupling hole 321*b*, preventing the protrusions 210*a*, 210*b*, and 210*c* from axial escape-off. Further, the third protrusion 210*c* may be fitted into the third coupling hole 321*c* through the fourth opening 322*d*, preventing the protrusions 210*a*, 210*b*, and 210*c* from radial, horizontal escape-off. Therefore, the couplings between the coupling holes 321*a*, 321*b*, and 321*c* and the protrusions 210*a*, 210*b*, and 210*c* have an anti-escape complementing structure, thereby preventing the radar housing 300 from escaping off the bracket 200.

Referring to FIG. 11, at least one of the protrusions 210 has a screw portion 215 formed along the outer circumferential surface of a lower end thereof, and the screw portion 215 may be coupled to a fastening hole 230 formed in the bracket 200. In other words, as the screw portion 230 rotates along the thread 235 formed in the inner circumferential surface of the fastening hole 230, the first protrusion 210*a* may be coupled to the bracket 200.

The tilting angle of the radar housing 300 coupled to the bracket 200 may be controlled depending on the length in which the first protrusion 210*a* is coupled to the bracket 200. For example, as the first protrusion 210*a* is coupled to be lower or higher than the other protrusions 210*b* and 210*c*, the radar housing 300 may be tilted from a lower portion of the body 310 to an upper portion thereof or from the upper portion of the body 310 to the lower portion thereof. Accordingly, the mounting angle of the vehicle radar provided inside the body 310 may be controlled by controlling the tilting angle of the radar housing 300 coupled to the bracket 200.

According to the present embodiments, the radar coupler may prevent a radar housing from escaping off a bracket when the bracket and the radar housing are simultaneously fastened together through a coupling part provided in the radar housing without using a socket.

Figure 12:
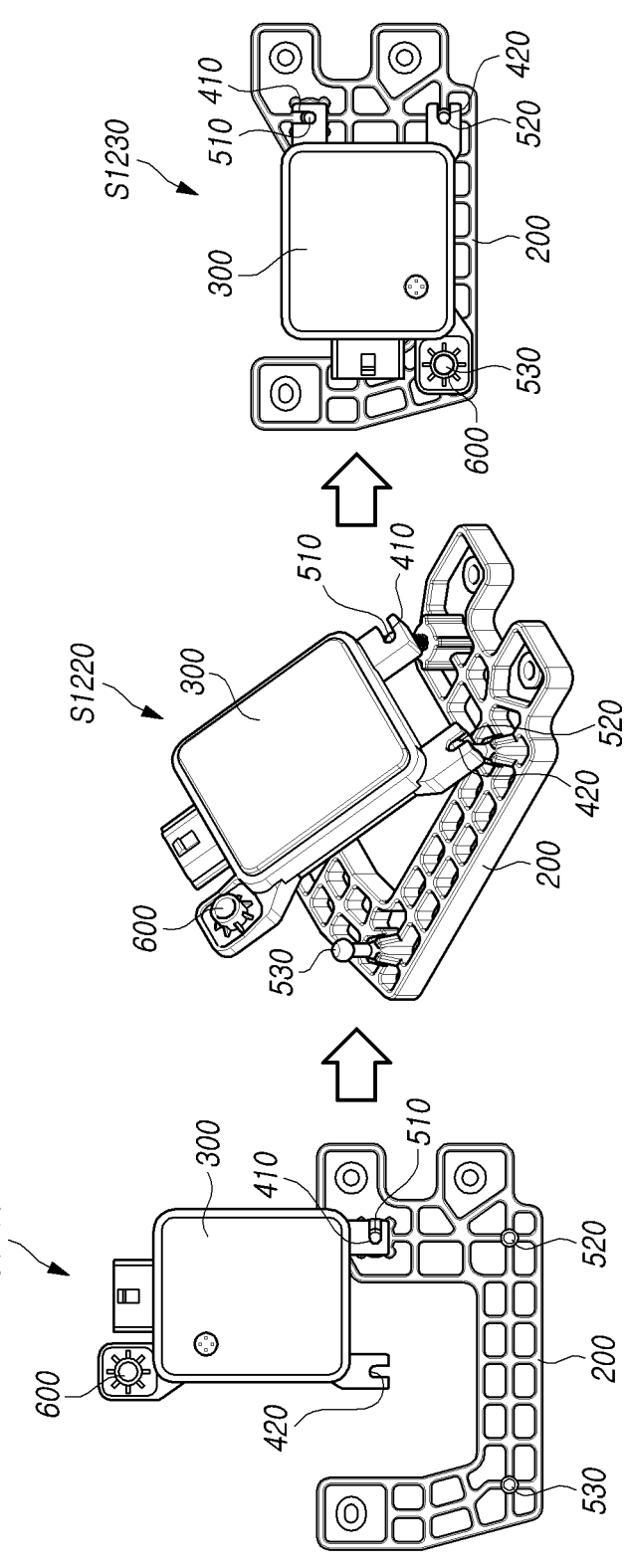
FIG. 12 is a flowchart illustrating a method for assembling a radar coupler according to the present embodiments.

FIG. 12 is a flowchart illustrating a method for assembling a radar coupler according to the present embodiments.

Referring to FIG. 12, a method for assembling a radar coupler includes a first axis coupling step (S1210) of sliding and fitting a first opening 410 provided to the radar housing 300 over a first protrusion 510 provided to the bracket 200. For example, the first opening 410 may be slid from the radial left side of the first protrusion 510 and fitted over the first protrusion 510.

Referring to FIG. 12, the method for assembling the radar coupler includes a second axis coupling step (S1220) of allowing a second opening 420 provided in the radar housing 300 to be slid and fitted over a second protrusion 520 provided in the bracket 200 by rotating the radar housing 300, with the radar housing 300 tilted. For example, the radar housing 300 may be rotated counterclockwise in the tilted state and, by the rotation, the second opening 420 may be slid from the radial left side of the second protrusion 520 and fitted over the second protrusion 520. In this case, the first opening 410 may be rotated along the outer circumferential surface of the first protrusion 510.

The directions in which the first opening 410 and the second opening 420 are open are not limited to the directions shown in FIG. 12. It should be interpreted that the first opening 410 and the second opening 420 may be provided in opening directions along which one of the first opening 410 and the second opening 420 is slidable over the protrusion 520, with the other of the first opening 410 and the second opening 420 fitted over the protrusion 510.

The first opening 410 and the second opening 420 may mean openings whose second sides are open from the coupling holes.

Referring to FIG. 12, the method for assembling the radar coupler may include a third axis coupling step (S1230) of placing the radar housing 300 on the bracket 200 in a horizontal direction and coupling them by press-fitting a third protrusion 530 provided in the bracket 200 into a through hole 600. For example, the third protrusion 530 may be press-fitted into the through hole 600 by lowering the radar housing 300, which is disposed ahead of the third protrusion 530, rearward, with the first protrusion 510 and the second protrusion 520 fitted.

The through hole 600 may mean a coupling hole whose second side is not open.

According to the present embodiments, the method for assembling the radar coupler facilitates assembly and may couple the radar housing 300 to the bracket 200 without using a socket. Further, the method may prevent the protrusions 510, 520, and 530 from escaping off in the axial direction and radial vertical and radial horizontal directions, with the radar housing 300 coupled to the bracket 200.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar coupler, comprising:
   a bracket having at least one protrusion projecting forward and mounted to a vehicle; and
   a radar housing including a box-shape body in which a radar is built and at least one coupling part provided on an outer edge of the body, the coupling part including a coupling hole into which the protrusion of the bracket is fitted, wherein the coupling part includes a first support having the coupling hole on an inner circumferential surface thereof and a second support, wherein the first support extends outward from the coupling hole, and a first side of an outer circumferential surface of the first support is connected with the body, wherein the second support extends forward along the coupling hole, wherein the at least one protrusion include a first protrusion, a second protrusion, and a third protrusion, wherein the coupling part includes a first coupling part having a first opening whose second side is open from the coupling hole in a first direction, a second coupling part having a second opening whose second side is open from the coupling hole in a second direction different from the first direction, and a third coupling part, and wherein the first protrusion and the second protrusion slide and are fitted into the first opening and the second opening, and the third protrusion is press-fitted in the coupling hole of the third coupling part.

2. The radar coupler of claim 1, wherein the coupling part further includes a third support extending forward and rearward from an end of a second side of the first support.

3. The radar coupler of claim 2, wherein the coupling part further includes a plurality of fourth supports spaced apart from each other and connecting a front surface of the first support and an outer circumferential surface of the second support.

4. The radar coupler of claim 1, wherein the protrusion is provided in a pillar shape, and wherein a portion where the first support and the second support are connected to each other is provided with an inclined portion where the coupling hole increases in diameter rearward.

5. The radar coupler of claim 4, wherein an end of the protrusion is provided with a protruding end radially projecting from the body, wherein a seating groove is formed in an inner circumferential surface of the second support to rest the protruding end, and wherein the seating groove has the same curvature as the protruding end.

6. The radar coupler of claim 1, wherein the coupling part is provided with an opening whose second side is open from the coupling hole.

7. The radar coupler of claim 6, wherein a width of the opening is smaller than a diameter of the coupling hole.

8. The radar coupler of claim 1, wherein among the at least one coupling part, the first coupling part is disposed at one of four corners of the body, and the second coupling part is disposed at a corner in a diagonal direction from the first coupling part.

9. The radar coupler of claim 1, wherein at least one of the at least one protrusion has a screw portion formed along an outer circumferential surface of a lower end thereof, and wherein the screw portion is fitted into a fastening hole formed in the bracket.

10. A method for assembling a radar coupler, comprising:

a first axis coupling step of sliding and fitting a first opening being open in a first direction and provided in a radar housing over a first protrusion provided in a bracket;

a second axis coupling step of sliding and fitting a second opening being open in a second direction different from the first direction and provided in the radar housing over a second protrusion provided in the bracket by rotating the radar housing in a tilted state of the radar housing; and a third axis coupling step of horizontally placing the radar housing on the bracket and press-fitting a third protrusion provided in the bracket into a through hole.

11. A radar coupler, comprising:

a bracket having at least one protrusion projecting forward and mounted to a vehicle; and a radar housing including a box-shape body in which a radar is built and at least one coupling part provided on an outer edge of the body, the coupling part including a coupling hole into which the protrusion of the bracket is fitted, wherein the coupling part includes a first support having the coupling hole on an inner circumferential surface thereof and a second support, wherein the first support extends outward from the coupling hole, and a first side of an outer circumferential surface of the first support is connected with the body, wherein the second support extends forward along the coupling hole, wherein the at least one protrusion include a first protrusion and a second protrusion, wherein the coupling part includes a first coupling part having a first opening whose second side is open from the coupling hole in a first direction, a second coupling part having a second opening whose second side is open from the coupling hole in a second direction perpendicular to the third direction, wherein the first protrusion and the second protrusion slide and are fitted into the first opening and the second opening.

* * * * *